United States Patent [19]

Saffold

[11] 4,088,253
[45] May 9, 1978

[54] RACK FOR BICYCLES

[76] Inventor: Robert Saffold, 1401 Kenwood Rd., Santa Barbara, Calif. 93109

[21] Appl. No.: 710,037

[22] Filed: Jul. 30, 1976

Related U.S. Application Data

[62] Division of Ser. No. 397,890, Sep. 17, 1973, Pat. No. 3,972,456.

[51] Int. Cl.² ............................................. B60R 9/10
[52] U.S. Cl. ................................. 224/42.03 B; 211/18
[58] Field of Search ................. 224/42.03 B, 42.45 R, 224/42.46 R, 29 R, 42.03 R, 42.03 A, 42.06, 42.04, 42.05, 42.07, 42.08; 214/450, 451, 454; 211/17, 20, 22, 21, 18, 19

[56] References Cited

U.S. PATENT DOCUMENTS

| 588,376 | 8/1897 | Banker et al. ........................ 211/17 |
| 3,225,986 | 12/1965 | Anderson ....................... 224/42.03 B |
| 3,464,608 | 9/1969 | Rodriguez ..................... 224/42.03 B |
| 3,735,981 | 5/1973 | Mallin ................................ 211/22 X |

FOREIGN PATENT DOCUMENTS 93,810   12/1938   Sweden ......................... 224/42.03 B Primary Examiner—Trygve M. Blix
Assistant Examiner—Jerold M. Forsberg
Attorney, Agent, or Firm—Townsend and Townsend

[57] ABSTRACT

A novel rack for carrying bicycles on cars and trucks comprising:

a). a pair of retaining bars, each such bar having a long upright arm, said long arm terminating in a notched opening, said opening being adapted to be received between the bicycle frame and the wheel axle, b). means for securing said bars to an automobile or truck, said bars being laterally displaced from each other by a distance corresponding to the wheelbase of a bicycle.

In one embodiment, each such bar has a long arm connected to a short arm, said short arm being adapted to restrain the bicycle wheel on the side of the bicycle opposite the side where the long arm is present.

5 Claims, 10 Drawing Figures

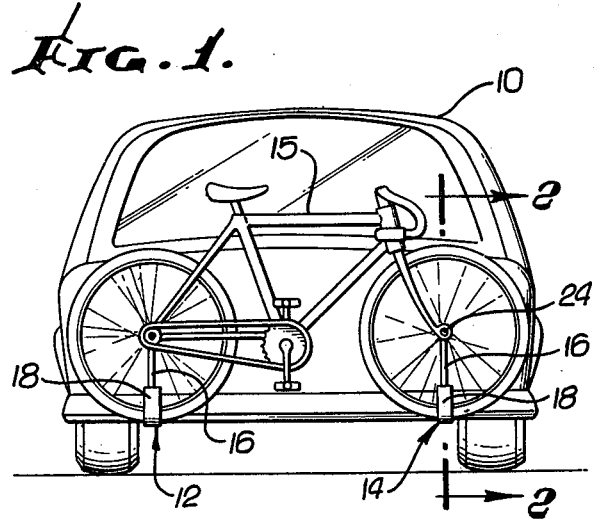
Fig. 1.
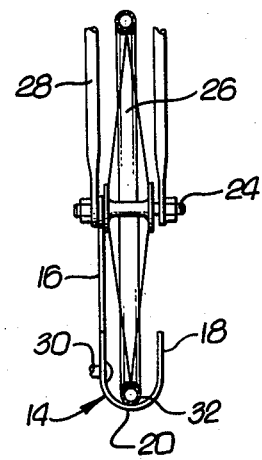
Fig. 2.
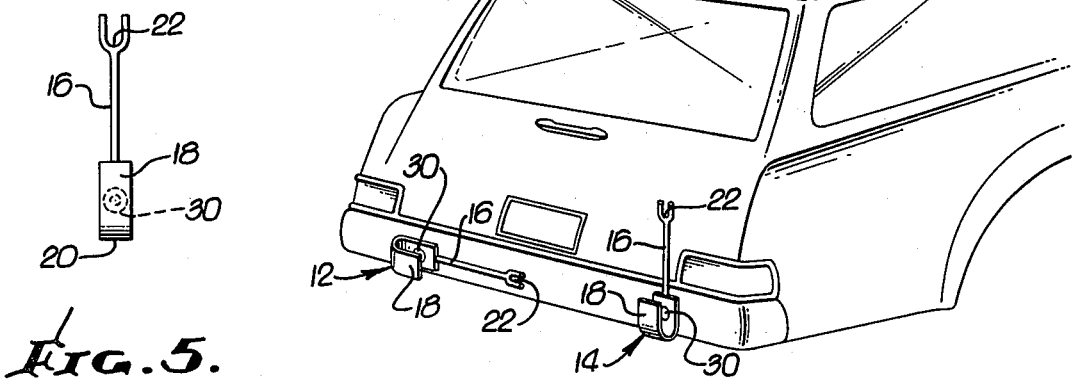
Fig. 3.
Fig. 4.
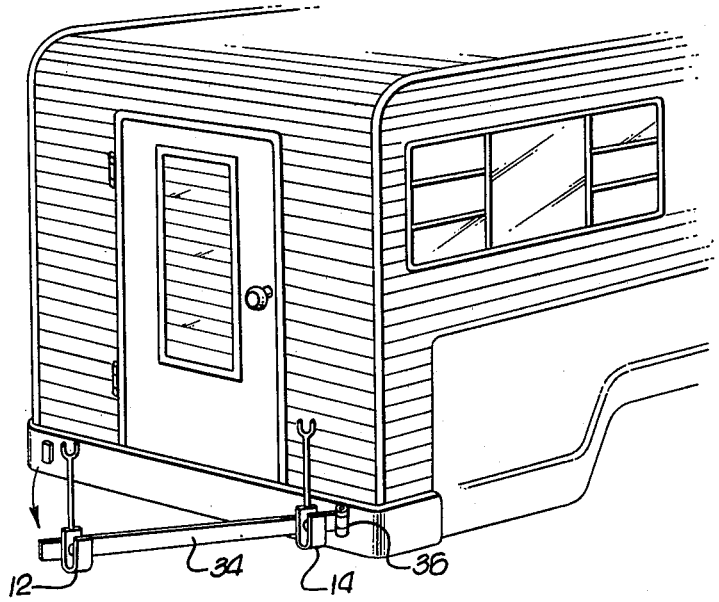
Fig. 5.

RACK FOR BICYCLES

This is a division of application Ser. No. 397,890, filed Sept. 17, 1973, now U.S. Pat. No. 3,972,456.

BACKGROUND OF THE INVENTION

This patent relates to an improved rack for carrying bicycles on cars and trucks. Bike racks in current use are for the most part variations on a common design comprising a universal bracket for attaching the rack to a car's bumpers, an inverted U-frame which attaches to the backets, and two arms attached to the closed end of the U-frame and on which one or more bicycles can be hung. While these conventional racks fit many cars well, the variety of auto designs makes them unsatisfactory on a large number of makes. Moreover, the U-frame is unsightly and frequently interferes with the owner's access to trunks, engine compartments, and, in station wagons and vans, rear doors. Many designs will not readily accept women's bikes, and often result in damage to the automobile or bicycle.

The improved bicycle rack described herein avoids many of these problems by gripping the bicycle in an entirely different fashion. The heart of this improved design is termed the "J-bar" and comprises a suitable mounting to the car's bumper plus a pair of vertically mounted members which support the two axles of the bicycle to be carried between the bicycle frame and the wheel axle. A portion of this vertical member may be curved to restrain the bicycle tire at the rim. Thus, it is believed that my invention represents a significant advance in the art. It is to be anticipated that it will be widely adapted and that numerous variations of it will occur to those familiar with the bicycle rack art.

SUMMARY OF THE INVENTION

Briefly, the present invention comprises a novel rack for carrying bicycles on cars and trucks comprising:

a. a pair of retaining bars, each such bar having a long arm, said long arm terminating in a notched opening, said notched opening being adapted to be received between the bicycle frame and the wheel axle, b. means for securing said bars to an automobile or truck, said bars being laterally displaced from each other by a distance corresponding to the wheelbase of a bicycle.

In one embodiment, each such bar has a long arm connected to a short arm, said short arm being adapted to restrain the bicycle wheel on the side of the bicycle opposite the side where the long arm is present.

It is an object of my invention to provide a novel rack for carrying bicycles on an automobile or truck.

More particularly, it is an object of this invention to provide a novel rack which does not substantially extend or protrude beyond the rear of the automobile or truck.

It is also an object of my invention to provide a rack that does not interfere with access to the trunk of an automobile, or the rear openings of station wagons and vans.

It is a major object of this invention to provide a rack which holds and retains the bicycle in such a manner that the front wheel and handle bars cannot move, viz, rotate while the bicycle is carried in the rack.

In one embodiment of my invention, the rack can be rotated or pivoted away from the rear of the vehicle. This is important in the case of vans, station wagons, campers, and the like, and hence is another object of the invention.

It is a further object to provide a supplemental rigid member to further secure the bicycle to the automobile or truck.

In yet another aspect, it is an object of the invention to provide a novel means for carrying two bicycles on an automobile or truck.

These and other objects and advantages of this invention will be apparent from the detailed description which follows considered together with the accompanying drawings.

DESCRIPTION OF THE PREFERRED EMBODIMENTS

Turning to the drawings:

FIG. 1 is a rear view of an automobile provided with one embodiment of the rack of this invention.

FIG. 2 is an end view of the rack of FIG. 1.

FIG. 3 is a side view of the J-bar embodiment of this invention.

FIG. 4 shows how the J-bar can be rotatably mounted to facilitate access to the rear of an automobile.

FIG. 5 shows the pivotally mounting of a member carried a pair of J-bars.

Figure 6:
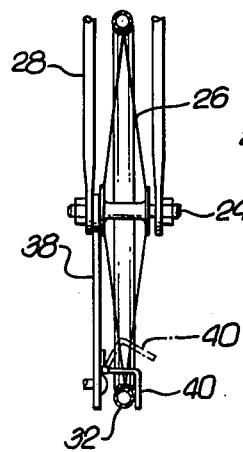
FIG. 6 shows an alternate embodiment to the J-bars.

One advantage of the rack of this invention is that it is unobtrusive. Conventional bike racks have arms which extend as much as 12 inches to the rear of the carrying vehicle; the rack extends no more than about 5 inches to the rear. This compact design minimizes the risk of damage to persons walking past the rear of the carrying vehicle. Also, the rack of this invention does not interfere with access to or the opening of the trunk of conventional automobiles. Because the J-bars are mounted a distance apart corresponding to the wheelbase of the bicycle carried, and because their vertical extent is of the order of 14 inches (compared with the 3 feet or so of conventional racks), ample clearance exists, permitting the trunks and rear doors of standard automobiles, station wagons and vans to be opened without inconvenience.

Using ordinary bike racks, the entire bicycle may swing precariously when the carrying vehicle is in motion. The front wheel particularly may swivel, running the risk of damage to the carrying vehicle or other objects passing near the carrying vehicle. With the rack of this invention, the wheels are prevented from swiveling or rotating. In contrast thereto, according to this invention, the bicycle is securely mounted. The rack mountings are significantly more secure than those typically found on conventional bike racks. On conventional racks the bumper attachments are spaced approximately 18 to 24 inches apart. Because the J-bars of the rack of this invention are spaced further apart (some 40–42 inches) to correspond with the wheelbase of the bicycle carried, they typically attach near the bumper mounting and so are less subject to wobbling caused by bumper flexing. In some installations, the mounting will be to the frame of the carrying vehicle itself where these are accessible and convenient.

Turning to the drawings in more detail, in this embodiment, the automobile 10 is provided with J-Bars 12 and 14 in which bicycle 15 is carried. The J-bar has a long arm 16 and a short arm 18 joined by curved portion 20. Each J-bar has at the upper terminus of the long arm, a notch or opening 22 which is receivable under the axle 24 and between the wheel 26 and the fork 28. Each J-bar is affixed to the automobile by mounting 30. The tire 32 of the bicycle generally rests in curved portion 20, as shown in FIG. 2.

In those instances where normal J-bar spacing would still interfere with the normal functioning of rear access devices, the J-bars are readily folded by providing suitable hinging mechanisms As shown in FIG. 4, the J-bars 12 and 14 may be rotatable to permit easier access to the rear of the vehicle when the rack is not in use.

A frequent problem encountered when carrying bicycles on the back of camper vehicles is that access to the camper door is obstructed. Using J-bars, access is convenient upon removing the bicycles. In many instances, however, this is itself a nuisance. This inconvenience can be eliminated by mounting the individual J-bars on a member which is hinged to the camper bumper in such a fasion that the entire rack with bicycles attached can be swung aside.

In the embodiment of FIG. 5, the J-bars 12 and 14 are mounted on member 34 which is pivoted at 36 so that the entire rack or rack and bicycle can be swung out of the way for unfettered access to the rear of, for example, a station wagon.

FIG. 6 shows an alternate to the J-bars. In FIG. 6, long member 38 carried a pivotally connected angle member 40 which is first moved to the up position, shown in dotted lines, when the bicycle is being placed in the rack. Then, the member 40 is moved down, as shown in solid lines, to help hold the bicycle securely.

Figure 7:
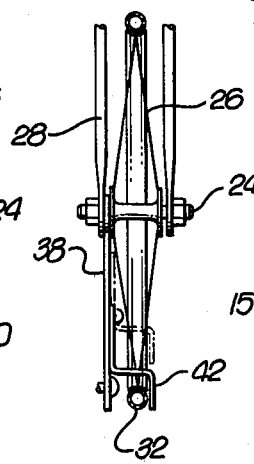
FIG. 7 shows another alternate embodiment to the J-bars.

The embodiment of FIG. 7 is somewhat like FIG. 6 except that member 42 is slidable up and down to permit simple placement of the bicycle in the rack.

A rigid member connecting the carried bicycle and the carrying vehicle may be useful in three situations:

1. Bumper flexure is such that a suitably rigid mounting is impossible or economically infeasible.
2. Two or more bicycles are to be carried.
3. The bicycle carried is of such lightweight construction that normal vehicle operation over rough roads imposes a sufficiently large moment on the bicycle wheel to run the risk of distorting it permanently. For example, in an abrupt stop or minor collision the momentum of the bicycle would be experienced as a force tending to bend the bicycle wheel at right angles to the plane of the supported wheels.

An adjustable and readily dismounted attachment which provides ample rigidity to assure proper functioning of the rack under the three situations itemized above.

Figure 8:
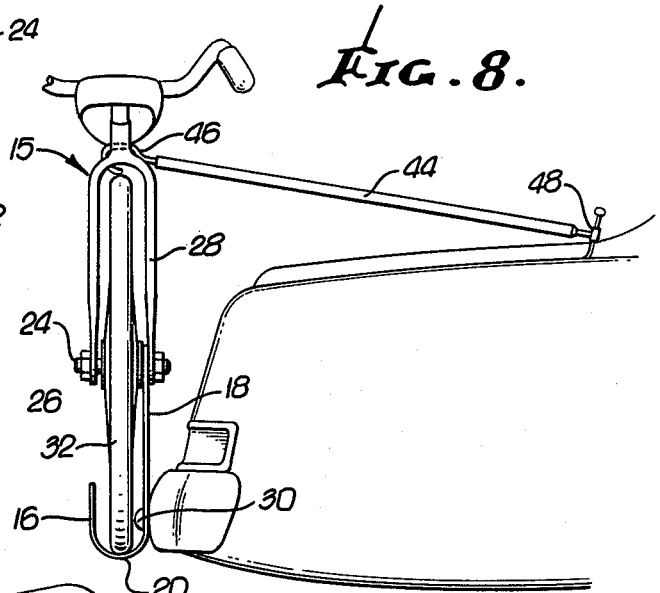
FIG. 8 shows the supplemental use of a rigid bar to prevent the swaying of the bicycle when in the rack.

FIG. 8 shows a supplemental rigid rod 44 which has a hook 46 for engaging the bicycle frame. The rod 44 is attached to the automobile, by fastener 48. The rod helps to prevent swaying of the bicycle to and fro curing starts and stops or motion otherwise generated by changes in speed or road condition. It is to be understood that the use of rod 44 normally obviates the need for the presence of short arms 18.

Figure 9:
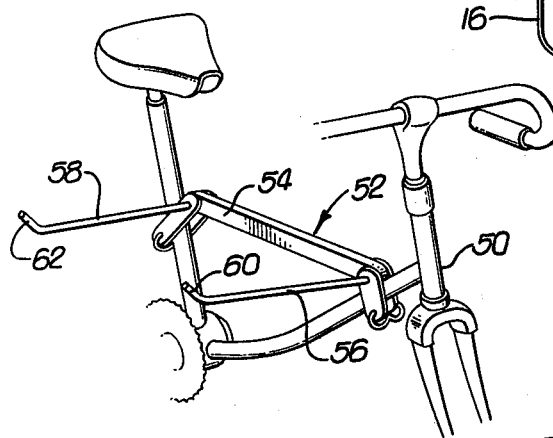
FIG. 9 shows a device adapted to permit the simultaneous transport of two bicycles.
Figure 10:
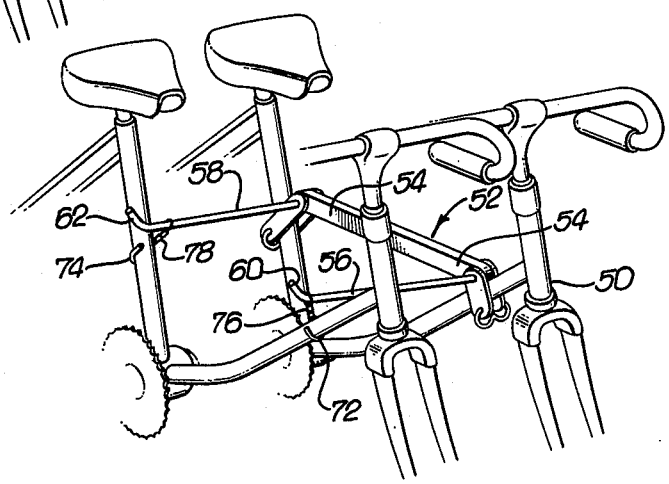
FIG. 10 shows two women's bicycles on the device of FIG. 9.

FIGS. 9 and 10 relate to a different facet of my invention. In many instances it will be desirable to transport two or more bicycles. To permit this use, an assembly termed a secondary rack is used. This is readily carried in the trunk of the vehicle when not in use. In use, it is designed to clamp easily and securely onto the frame of the first bike, and provides two arms of sufficient strength and size to accomodate a second bike. Additional bikes may be carried using additional secondary racks. Women's bikes may also be carried using simple adapters. Bicycle 50 is carried by an automobile, preferably in one of the racks just described. The secondary rack 52 is for carrying a second bicycle, and comprises a bar 54, projections 56 and 58, and curved portions 60 and 62. Projections 56 and 58 can directly carry the upper bar of a man's bicycle frame (not illustrated). In the case of a woman's bicycle, hooks 72 and 74 and chains 76 and 78 can be used as shown in FIG. 10.

Having fully described the invention, it is intended that it be limited only by the lawful scope of the appended claims.

I claim:

1. A rack for carrying a bicycle on a vehicle comprising: a pair of bars, each bar having an upper part provided with a notch at its uppermost end for receiving the axle of a respective one of the wheels of the bicycle with the notch being positionable between the bicycle frame and the respective wheel, each bar further having a lower part and an arm shiftably mounted on the lower part to form therewith a wheel confining space for receiving the lower portion of a bicycle wheel therebetween to limit movement of the wheel transversely of its plane when the axle of the wheel is received in the notch of the corresponding bar; means coupled with the bars for securing the same to a vehicle in respective, spaced upright positions with said bars being laterally spaced from each other by a distance corresponding substantially to the wheel base of the bicycle; and means attachable to the frame of a bicycle intermediate the axles thereof for coupling the frame to a vehicle to limit movement of the frame relative to the vehicle when the bars are secured thereto, when the axles of the bicycle are received by respective notches, and when the lower portions of the wheels of the bicycle are in the wheel confining spaces.

2. The novel rack of claim 1 wherein said arm is pivotally connected to said lower part.

3. The novel rack of claim 1 wherein said arm is slidably connected to said lower part.

4. The novel rack of claim 1 wherein the means for securing said bar includes a horizontal beam to which said bars are affixed, said beam being pivotally connectable at one end to an automobile or truck to permit said beam and the affixed bars to be swung out of the way to facilitate access to the rear of an automobile or truck.

5. The novel rack of claim 1 wherein means are provided whereby a bicycle in the rack can carry a second bicycle.

* * * * *